United States Patent [19]

Wickersheim et al.

[11] Patent Number: 4,789,992
[45] Date of Patent: * Dec. 6, 1988

[54] OPTICAL TEMPERATURE MEASUREMENT TECHNIQUES

[75] Inventors: Kenneth A. Wickersheim, Menlo Park; Mei H. Sun, Los Altos; Stanley O. Heinemann, Irving, all of Calif.; Stanley O. Hinemann, Irvine, all of Calif.

[73] Assignee: Luxtron Corporation, Mountain View, Calif.

[*] Notice: The portion of the term of this patent subsequent to Mar. 24, 2004 has been disclaimed.

[21] Appl. No.: 27,828

[22] Filed: Mar. 19, 1987

Related U.S. Application Data

[60] Division of Ser. No. 787,784, Oct. 15, 1985, Pat. No. 4,652,143, which is a continuation-in-part of Ser. No. 676,110, Nov. 29, 1984, abandoned.

[51] Int. Cl.$^4$ .............................................. G01K 11/20
[52] U.S. Cl. .................................. 374/161; 374/131; 374/129; 250/458.1; 250/459.1
[58] Field of Search ............... 374/121, 127, 129, 130, 374/131, 152, 161, 159; 356/44; 250/458.1, 459.1

[56] References Cited

U.S. PATENT DOCUMENTS

| | | | |
|---|---|---|---|
| Re. 31,832 | 2/1985 | Samulski | 374/131 |
| 4,075,493 | 2/1978 | Wickersheim | 374/159 |
| 4,179,927 | 0/1979 | Saaski | . |
| 4,215,275 | 7/1980 | Wickersheim et al. | 374/137 |
| 4,223,226 | 9/1980 | Quick et al. | 250/458.1 |
| 4,307,601 | 12/1981 | Saaski et al. | 374/152 |
| 4,374,328 | 2/1983 | Tekippe et al. | 374/121 |
| 4,376,890 | 3/1983 | Engstrom et al. | 374/131 |
| 4,437,772 | 3/1984 | Samulski | 374/129 |
| 4,448,547 | 5/1984 | Wickersheim et al. | 374/131 |
| 4,560,286 | 0/1985 | Wickersheim | . |
| 4,652,143 | 3/1987 | Wickersheim et al. | 374/161 |
| 4,662,748 | 5/1987 | Tanaka et al. | 250/458.1 |

FOREIGN PATENT DOCUMENTS

| | | | |
|---|---|---|---|
| 51452 | of 1972 | Japan | . |
| 31382 | of 1974 | Japan | . |
| 0076086 | 6/1977 | Japan | 374/131 |
| 58-137723 | of 1983 | Japan | . |
| 1480583 | of 1977 | United Kingdom | . |
| 2064107 | of 1981 | United Kingdom | . |
| 2113837 | of 1983 | United Kingdom | . |

OTHER PUBLICATIONS

"Fiber-Optic Temperature Sensor Using Fluorescence Decay Time," Bosselman et al., Conference Proceedings, 2nd International Conference on Optical Fiber Sensors, Sep. 5-7, 1984, pp. 151-154.

"16-Channel Fiberoptic Thermometry System," Wickersheim et al., a two-page poster paper presented at the Third Annual Meeting of the Radiation Society in Los Angeles, May 5-9, 1985.

"Advances in Fluoroptic Thermometry: New Applications in Temperature Measurement," Sun et al., presented at Digitech '85 of the Instrument Society of America, May 14-16, 1985.

(List continued on next page.)

Primary Examiner—William A. Cuchlinski, Jr.
Assistant Examiner—Thomas B. Will
Attorney, Agent, or Firm—Majestic, Parsons, Siebert & Hsue

[57] ABSTRACT

An optical temperature measurement technique that utilizes the decaying luminescent intensity characteristic of a sensor composed of a luminescent material that is excited to luminescence by a light pulse or other periodic or other intermittent source of radiation. The luminescent emissions of a preferred sensor exhibit an approximately exponential decay with time that is the average of a distribution of chemically reproducible crystallites and are repeatable with a high degree of accuracy regardless of excitation level or prior temperature history of the sensor.

38 Claims, 4 Drawing Sheets

OTHER PUBLICATIONS

"Second Generation Fluoroptic® Thermometer," Wickersheim et al., presented at Digitech '85 of the Instrument Society of America, May 14–16, 1985.

*Fluorescent Lamp Phosphors*, Butler, The Pennsylvania State University Press, Chap. 1, pp. 1–6, and all of Chap. 4, particularly Section 4.6 on pp. 54–55.

"Remote Optical Measurement of Temperature Using Luminescent Materials," J. S. McCormick, *Electronics Letters*, vol. 17, No. 18, 3 Sep. 1981, pp. 630–631.

"Photoluminescent Thermometry Based on Europium-Activated Calcium Sulphide," Şamulski et al., 1982, *The Institute of Physics, Phys. Med. Biol.*, vol. 27, No. 1, pp. 107–114.

"Line Shift Method for Phosphor Temperature Measurement," Kusma et al., Dec. 1976, pp. 2349–2358.

"Recent Advances in Optical Temperature Measurement," Wickersheim & Alves, *Industrial/Research Development*, Dec. 1979.

"Photoaluminescent Thermometer Probes: Temperature in Microwave Fields," Samulski, *Science*, vol. 208, 11 Apr. 1980, pp. 193–194.

"Anion and Cation Defect Structure in Magnesium Fluorogermanate," Bless et al., *Journal of Solid State Chemistry*, 4, 1972, pp. 262–268.

Mesure de Temperatures de Surface, Leroux & Taboue, *Mesures.Regulation.Automatisme*, Oct. 1975, pp. 49–53.

One-page data sheet and one-page price list for the Model 750 temperature sensing instrument of Luxtron Corporation.

Japanese language and English translation of a brochure of Omron Tateisi Electronics KK relating to an optical temperature sensing instrument.

"The Emission Spectrum of Manganese-Activated Magnesium Germanate," Patten & Williams, *Journal of the Optical Society of America*, vol. 39, No. 8, Aug. 1949, pp. 702–704.

Sholes et al., "Fluorescent Decay Thermometer w/ Biological Applications", Rev. Sci. Instrum., 51(7), Jul. 1980, pp. 882–884.

Kemeny et al., "Activator Center in Magnesium Fluorogermanate Phosphors", Journal of Chemical Physics, vol. 33, No. 3, Sep. 1960, pp. 783–789.

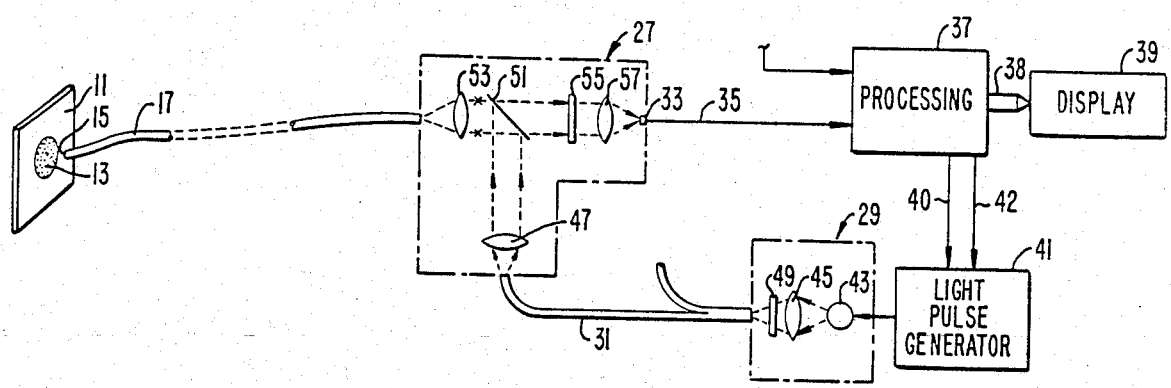
FIG._1.
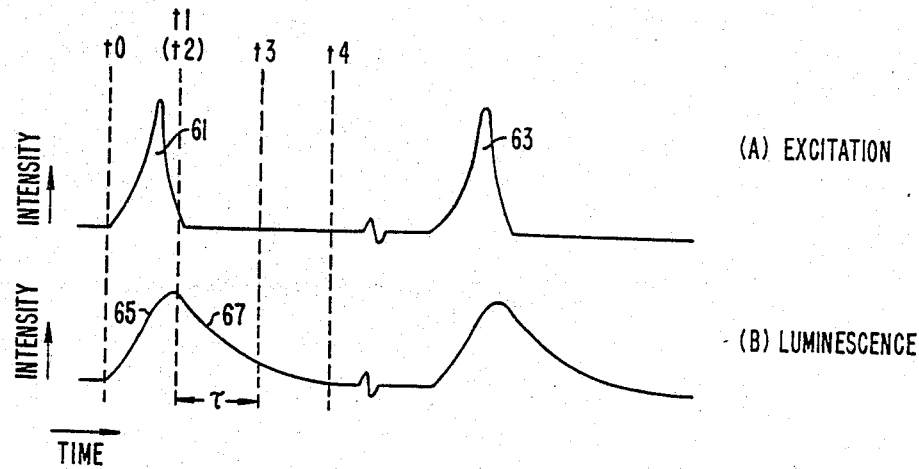
FIG._2.
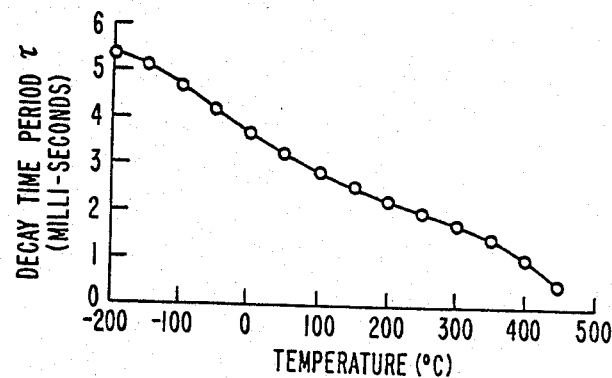
FIG._3.

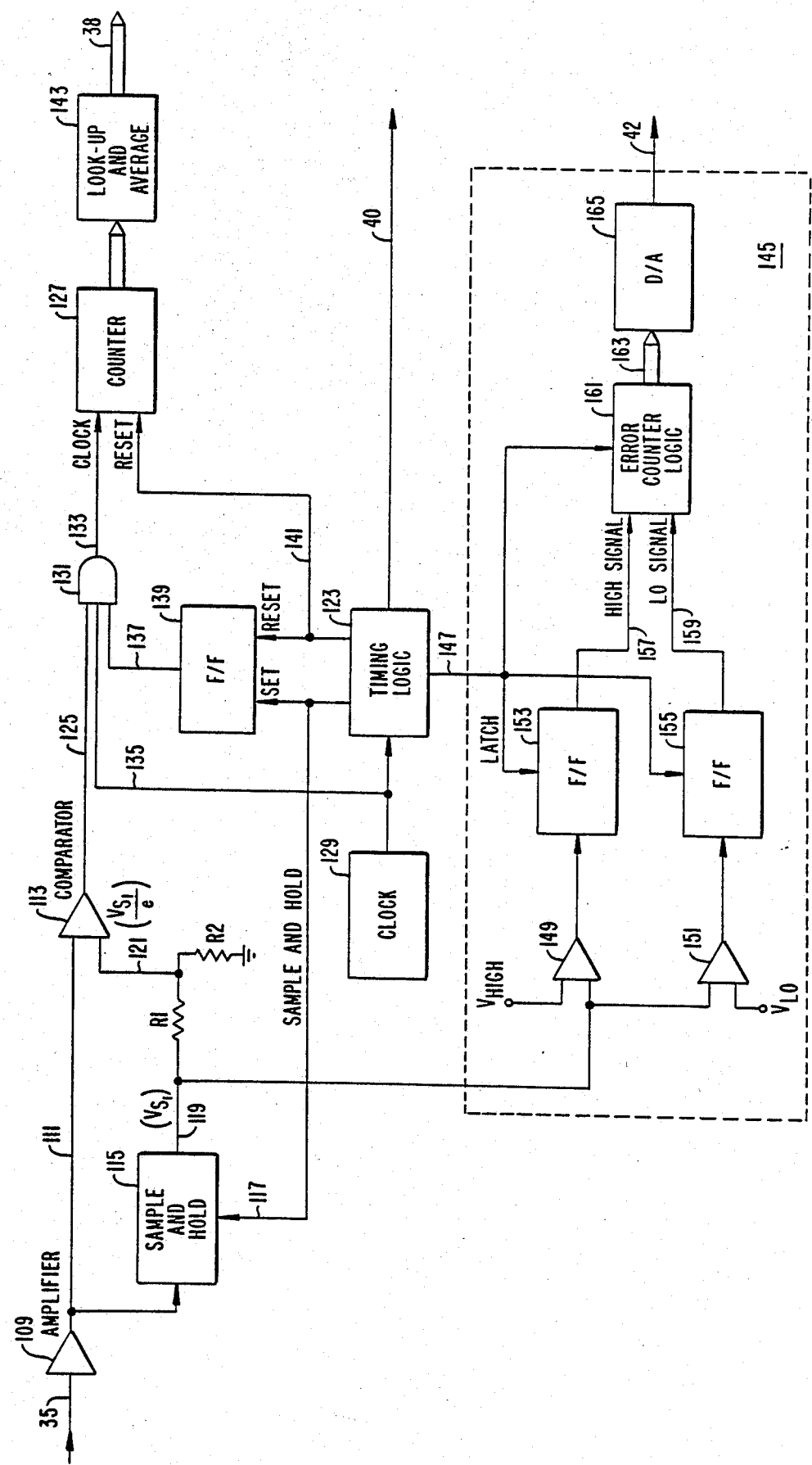
FIG._4.

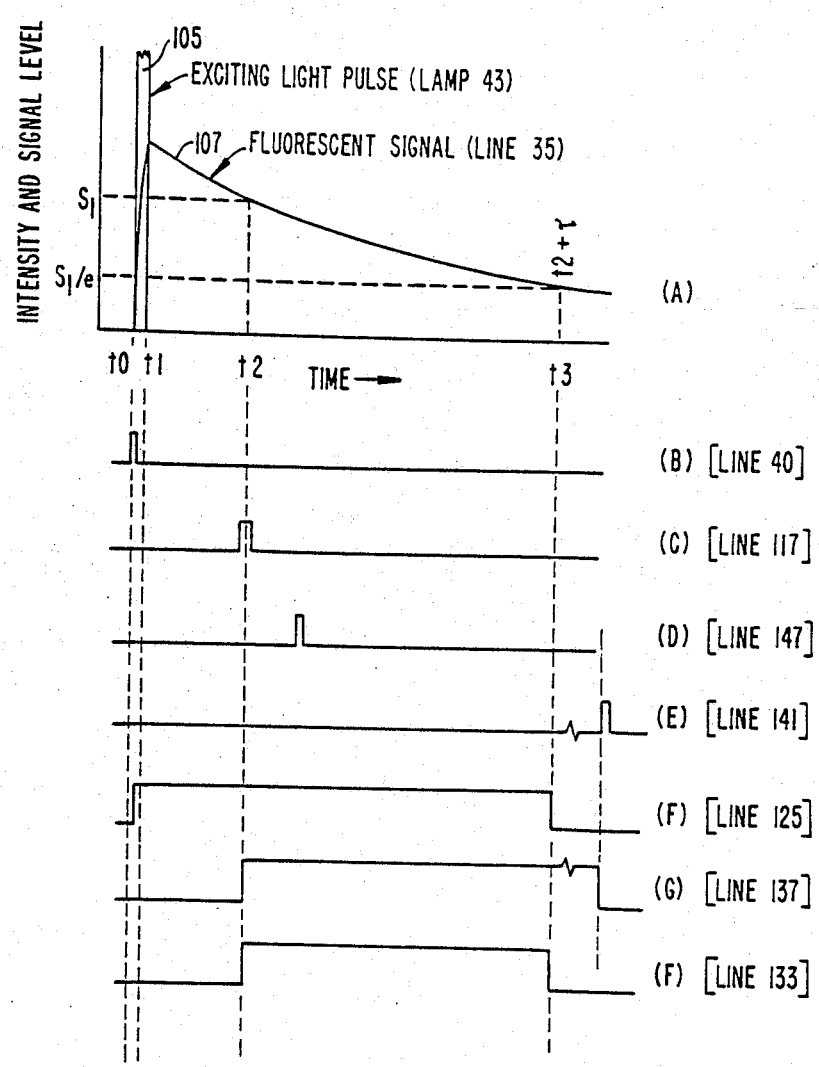
FIG._5.

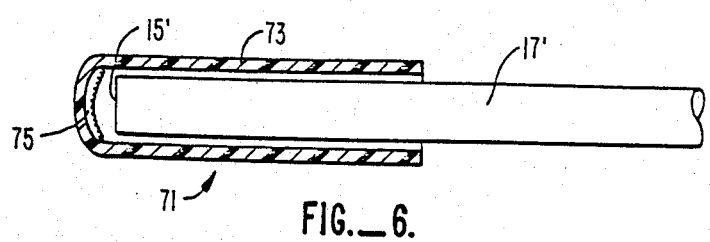
FIG._6.
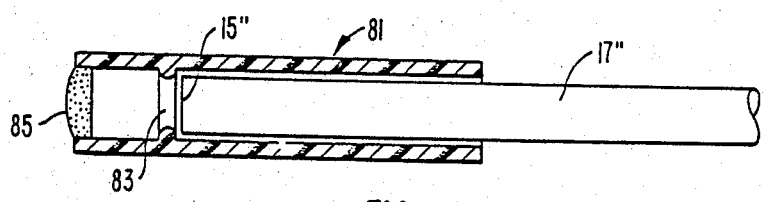
FIG._7.
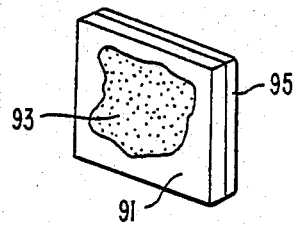
FIG._8.
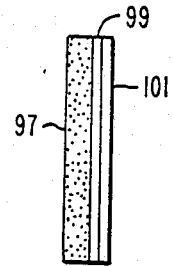
FIG._9.
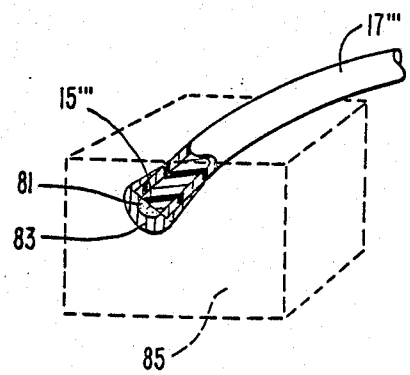
FIG._10.

OPTICAL TEMPERATURE MEASUREMENT TECHNIQUES

CROSS-REFERENCE TO RELATED APPLICATION

This is a division of application Ser. No. 787,784, filed Oct. 15, 1985, now U.S. Pat. No. 4,652,143, issued Mar. 24, 1987, which in turn is a continuation-in-part of co-pending application Ser. No. 676,110, filed Nov. 29, 1984, abandoned.

BACKGROUND OF THE INVENTION

This invention relates generally to the art of optical temperature measurements, and more particularly to those made with the use of luminescent materials that emit radiation having a measurable characteristic that varies as a function of temperature.

There are many temperature measurement applications suggested for optical techniques using luminescent materials as the temperature sensor. One is a remote, non-contact method of measuring temperatures by coating a surface of interest with a luminescent material, exciting the material to luminesce by directing excitation radiation against it, and directing the resultant temperature dependent luminescent radiation onto a detector by an appropriate optical system such as one using lenses or optical fibers. Applications of the non-contact technique include accurate measurements of surface temperature, including surfaces of objects positioned within a vacuum chamber, measurement of the temperature of moving materials or machinery, and measurements of the temperature distribution over large surface areas which would be difficult or impractical to instrument with contact type point sensors. Other applications include those where the luminescent sensor material is contained in a structure designed to slip over but not be permanently attached to an optical fiber or fiber bundle. This can be either as a disposable item or as a special configuration for use in measuring high temperatures.

Another method of application of optical techniques includes the formation of a temperature sensing probe by attaching a small amount of luminescent material to an end of an optical fiber or bundle of fibers, and then immersing the probe in an environment whose temperature is to be measured. Applications of the probe technique include those in medical hyperthermia, a cancer therapy treatment wherein the small probe is implanted in a human body to measure internal temperatures during induced heating, and in measuring internal temperatures of large electrical machinery such as power transformers. The measurement is made by an instrument remote from the sensor to which the other end of the fiber or fiber bundle is connected. The instrument generates excitation radiation which is passed to the sensor through the fiber, and then receives the luminescent radiation from the sensor for detection and measurement of the temperature of the sensor. Commercial instruments exist that use this optical fiber probe technique. A particular advantage of the optical fiber probe over standard thermocouple or other electrical temperature sensing devices, is that it is not affected by electromagnetic energy fields since the probes contain no electrically conducting materials. The fact that the technique is optical rather than electrical also allows applications where the light path from a luminescent material sensor to an instrument can include segments containing only vacuum, air, liquid or other material transparent in the spectral region of interest.

There are two basic types of luminescent radiation detection techniques now being used or suggested for use for such temperature measurements. One of the techniques is to measure the static intensity of the luminescent radiation to determine the temperature of the luminescent material. The other technique is to modulate the excitation of the luminescent material and then measure the time dependent characteristics of the luminescence as a function of temperature.

It was early recognized that the luminescent intensity technique had inherent errors in its readings due to variations in the luminescent intensity caused by factors other than the temperature of the luminescent material. One factor, for example, is a change of intensity of the excitation radiation source over time, which causes a corresponding change in the luminescent intensity that is unrelated to temperature. Another factor is a change in intensity of radiation transmitted by an optical fiber when the fiber is bent. In order to eliminate such changing intensity and similar non-temperature related factors from affecting the resulting temperature reading, commercial instruments utilize, and the literature suggests, examining the intensity of the luminescence at two separate definable wavelength bands emanating from the same sensor. Signals proportional to those separate intensities are then ratioed or otherwise compared in order to eliminate such non-thermal intensity changes which are common to both signals. The intensity ratioing technique has been very useful for improving accuracy of temperature readings but has been found not to eliminate all causes of intensity variations caused by factors other than temperature change of the sensor. Errors caused by these other factors can be reduced further by re-calibration of the temperature sensor wherein the sensor is held at a known temperature and the instrument then adjusted to read that temperature.

Time dependent temperature measurements suggested in the literature, the second of the two basic types of luminescent techniques, are generally insensitive to these other factors since relative intensities are not measured. These techniques measure the temperature dependent characteristics of luminescent decay that continues after the excitation radiation has ceased. However, these techniques have a disadvantage of not being repeatable under all circumstances and thus also require recalibration of the temperature sensor during use.

Frequent calibration is difficult or undesirable in many applications, such as in non-contact surface temperature measurements, production and/or process control applications, measurements requiring an optical fiber probe to be permanently installed in a large piece of operating equipment, measurements during a medical procedure, or with the use of sterile disposable optical fiber temperature probes that would require calibration before use of each new probe.

Therefore, it is a primary object of the present invention to provide an improved optical temperature measurement technique that requires either no or only one time calibration.

It is another object of the present invention to provide a technique that is useful for having its temperature probes permanently installed in electrical machinery.

It is a further object of the present invention to provide a technique that is useful with disposable temperature sensing probes or sensors.

It is yet another object of the present invention to provide a technique that is useful for measuring remotely the temperature of surfaces.

It is still another object of the present invention to provide a technique that is useful for measuring the temperature of rotating or moving objects without contact with them.

It is another object of the present invention to provide a luminescent temperature measuring technique that works well at high temperatures, thereby to be more useful in industrial and process control applications.

SUMMARY OF THE INVENTION

These and additional objects are accomplished by the present invention, wherein, briefly, the characteristics of a luminescent material and luminescent detection techniques are optimized. A time dependent type of optical temperature measurement technique is utilized. The luminescent material is chosen to have a highly reproducible luminescent intensity function continuing in time after termination of the excitation radiation that closely approximates a single exponentially decaying function whose time constant is related unambiguously to temperature, and which is substantially independent of the excitation radiation intensity, the effect of binding or dispersing media, and any prior temperature or excitation history of the luminescent material. It has been found that the use of such a luminescent material as a temperature sensor in a decay time measuring system overcomes the difficulties of the intensity ratioing type of system described above, as well as the errors introduced by the use of other types of luminescent sensors in a time dependent measurement system. One example of such a luminescent material is either magnesium germanate or magnesium fluorogermanate, activated with tetravalent manganese. A preferred form of the luminescent sensor is a powder comprising a very large number of small particles or crystallites having similar composition and properties. This form allows the coating of surfaces of various shapes and sizes using a binder or adhesive of appropriate characteristics. This form also minimizes the problem of controlling differences in decay time characteristics from crystallite to crystallite since the signal is the sum of those from each of a large number of such crystallites. A preferred measurement system detects the luminescence decay time directly over a portion of the decaying intensity curve at the same specific time after the excitation pulse.

The use of such a sensor material and measuring system allows the making of accurate and repeatable temperature measurements with very little or no calibration being necessary. One class of applications where this is important is those where the luminescent radiation imaging system includes the possibility of dimensional changes over time or between different sensors. For example, in the measurement of surface temperatures, the luminescent material is coated or otherwise attached to the surface whose temperature is to be measured and is optically coupled to an instrument without physical contact with the luminescent material, by lenses or by an optical fiber. The specific positioning of the optical elements with respect to the sensor is likely to change during a particular measurement and will undoubtedly be different from measurement to measurement. Other examples of applications involving variable optical dimensions or geometries include the use of probe covers attached to optical fibers and optical commutation between a sensor on a moving part and a stationary measuring instrument. Provided sufficient optical signals are generated, the technique of the present invention is insensitive to such dimensional or geometric variations and further does not require the frequent calibration of prior techniques that is so extremely difficult in such applications.

The use of such a sensor material and measuring technique also allows the fabrication of an optical fiber probe which can be permanently implanted in a large piece of machinery or equipment and left there since no periodic calibration is required.

This luminescent material also makes practical the use of disposable optical fiber probes, particularly useful in medical applications, since calibration of each new sensor is not required and since the effects of fiber bending will not affect the accuracy of the sensors.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1 schematically illustrates an improved optical temperature measurement system according to the present invention;

FIG. 2 shows waveforms occurring in the system of FIG. 1 in operation;

FIG. 3 is a curve illustrating, as an example, the characteristics of the sensor of FIG. 1 with a particular luminescent material;

FIG. 4 is a block diagram of an electronic processing circuit for the system of FIG. 1;

FIG. 5 is a timing diagram showing the operation of the circuit of FIG. 4;

FIGS. 6 and 7 show examples of one alternate form of a temperature sensor;

FIGS. 8 and 9 illustrate other forms of a temperature sensor;

FIG. 10 schematically illustrates an application of the techniques of the present invention utilizing an optical fiber probe.

DESCRIPTION OF THE PREFERRED EMBODIMENTS

An example of a particular application for optical temperature measurement is illustrated in FIG. 1. In that example, the temperature of a surface 11 is measured. The surface 11 could be part of, for example, an integrated circuit wafer whose temperature is to be monitored during processing, a component of a large piece of machinery, a model aircraft in wind tunnel tests, and many others. Measurement of surface temperature, even for stationary objects, is extremely difficult since heat flow between the surface and any contact type sensor will typically be dominated by flow from other sources, with performance being a very strong function of the thermal contact between the sensor and the surface. Even infra-red techniques are imprecise because the infra-red emissivity of the surface must be accurately known and interferences from reflections from other infra-red sources must be eliminated to allow correct conversion of measured infra-red radiation to true surface temperature.

To overcome these problems, a layer 13 of luminescent material is attached to the surface 11. This attachment can be accomplished in many ways, such as by coating the luminescent material suspended in powder form in a binder of resin or glass directly onto the surface. An appropriate glass binder is potassium silicate or Corning sealing glass. An appropriate resin is silicone hard coating material. Alternatively, a substrate carrying the luminescent material, as illustrated in FIGS. 6 and 7, may be attached to the surface 11, as another specific example. In either case, the coating of luminescent material comes into thermal equilibrium with the surface 11 whose temperature is to be measured.

The luminescent temperature sensor 13 is excited to luminesce upon illumination with visible or near visible light emitted from the end 15 of an optical fiber communication medium 17. Alternatively, excitation radiation could be directed against the sensor 13 by optical elements independent of the optical fiber 17, such as by flooding the sensor with such radiation. The wavelength range of the excitation radiation is appropriate for the particular luminescent material 13 being utilized. The optical fiber medium end 15 is held a distance away from the sensor 13 without contact between them. The resultant luminescent radiation, in a visible or near visible radiation band is usually, but not necessarily, of longer wavelength than the excitation radiation. The luminescence is captured by the end 15 of the optical fiber communication medium 17 and passed therealong to the measuring instrument. The fiber medium 17 can include a single fiber, a number of fibers, or an auxilliary light collecting lens or mirror system, depending upon the particular application.

It is a temperature dependent characteristic of the luminescent radiation from the sensor 13 that is measured in order to determine temperature of the luminescent material and thus of the surface 11. One such characteristic used in existing instruments is the relative intensity in two fairly narrow wavelength bands. But it has been found that the use of an optical fiber system can cause reading errors because of the characteristics of the fiber system itself. These sources of error are due to the unequal transmission of the two wavelength bands of radiation that are measured. A change in such relative transmission differences results from bending of the fiber medium itself. The light radiation is passed through the fiber by repetitive reflections at the interface between the fiber core and its cladding. Light striking its interface at less than a critical angle determined by the indices of refraction of the fiber core and cladding, is totally internally reflected and hence trapped in the fiber to be transmitted down its length by repeated reflection. However, the indices of refraction vary with wavelength.

Therefore, the ratio of transmitted intensities is a function of the two wavelengths of interest. By calibrating the two wavelength ratioing system against a known temperature, this transmission difference can be corrected. However, bending the fiber will cause the critical angle for total internal reflection to change differently for the two wavelengths. The result will be a change in the ratio of the two transmitted intensities. This is interpreted as a change in the temperature reading which is, of course, undesirable because the change has nothing to do with the actual temperature of the sensor 13 that is to be measured.

The bending effect is particularly important in medical applications where high accuracy is required and where fiber bending may be unavoidable in clinical use. There are also many other effects which can change the ratio in the two-wavelength system over longer periods of time which may be more important in various industrial applications. For example, if the transmission link is an optical fiber and if there is high energy radiation present, as in a nuclear reactor, color centers may be formed in the fiber over a period of time which change its spectral transmission characteristics and hence the relative transmission at the two wavelengths of interest. In such an application, because of the radiation levels, it would be difficult to recalibrate frequently. It is also possible that the electronic gain of the two detectors and signal processing channels might change with time or temperature. In all cases, such relative changes in the two separate channels of the ratioing system will produce apparent temperature changes which are not valid.

These non-temperature dependent factors that affect the temperature reading may not be a serious problem in some applications, particularly if the measurement time after calibration is short, if the temperature accuracy required for the application is not high, or if it is practical to correct the errors by periodic recalibration over time. But in applications where accuracy must be high, or where recalibration is not practical, these factors must be taken into account. The two intensity ratioing technique inherently eliminates many potentially erroneous non-temperature variations that would affect the temperature reading, but as noted above, does not automatically cancel all signal variations that may occur over time in the two separate channels. Some of these undesirable variations may be kept under control by recalibration of the system from time to time but this requires placing the luminescent sensor of the system at a known temperature so that instrument adjustments can be made. This calibration requirement is inconvenient in any case where it is required to be done very often, and may be impractical in many desired temperature measurement applications where the sensor is fixed at a remote and inaccessible location.

For example, in the surface temperature measurement technique illustrated in FIG. 1, it may be very difficult or impossible to measure independently the temperature of the surface 11 at the position of the sensor 13 in order to make this calibration. And once the calibration is made, any bending of the fiber medium 17 or any long term change in the relative gain of the two signal processing channels would introduce errors that would require recalibration.

Therefore, in order to eliminate these disadvantages, the system of FIG. 1 excites the phosphor 13 with a pulse of light, and then after the pulse has ended, measures a specific characteristic of the decaying luminescent intensity such as its decay time. With this technique, only one wavelength band is required. This could use the entire emission band of the luminescent material, or a narrower band selected from the total emission. In any event, only one optical path and one spectral band is involved for the returning signal and only one detector and one signal processing channel is used for each sensor to detect and analyze the transient data. As a result, all of the errors associated with the two channel system mentioned above disappear. The only surviving requirements are: (1) that the decay time is truly characteristic of the sensor material and is not affected by either the intensity of excitation (within bounds) or the thermal or illumination history of the sensor, and (2) that there are no extraneous time dependent signal changes, as from stray light, which occur during the brief interval of the measurement and which alter the detected temperature signal.

Returning to FIG. 1, an optical system 27 connects the fiber medium 17 with a source 29 of excitation radiation through another fiber medium 31. The optical assembly 27 also communicates the luminescent radiation from the fiber medium 17 to a detector 33 that is electrically connected by conductors 35 to an electronic processing system 37. The processing circuits 37 convert, by reference to an empirically established conversion table, the luminescent radiation decay characteristics of the sensor 13 into a temperature that is communicated over a circuit 38 for indication by a display 39. The timing of an excitation pulse driving circuit 41 is controlled by the processing circuits 37 through a line 40. The circuit 41 is connected to a flash lamp 43 of the excitation source 29. Its brightness is set by a signal in line 42. The periodic pulse from the lamp 43 is imaged by a lens 45 through a bandpass filter 49 into an end of the optical fiber transmission medium 31. The filter 49 limits the wavelengths to the range that is useful to excite the particular luminescent sensor 13. As indicated in FIG. 1, the processing circuits 37 and excitation source 29 can be shared among a number of temperature sensors by repeating the optical system 27 for each.

The optical system 27 includes a lens 47 for collimating the excitation light at an end of the fiber medium 31. The collimated excitation pulses are directed to a beam splitter 51 and thence through a lens 53 into an end of the optical fiber transmission medium 17 for exciting the sensor 13 to luminescence.

As an alternative technique for providing excitation radiation, the source 29 and pulse generator 41 could be replaced by a continuous source, such as a tungsten lamp, a light emitting diode or a laser, with a mechanical chopper positioned to interrupt the emitted light in synchronism with the decay time measurements and controlled by the processing circuits 37. As another alternative, the beam splitter could be eliminated with instead one or more fibers conducting exciting radiation from the source to the sensor and another one or more fibers conducting the emitted luminescence from the sensor to the detector.

The luminescent radiation from the sensor 13 is returned by the fiber medium 17 to the instrument where the returning radiation is again collimated by the lens 53. The collimated beam passes through the beam splitter 51 and an optical filter 55 which limits the radiation passing through it to the wavelength band of luminescence of the sensor 13. The wavelength bands allowed to pass by the filters 49 and 55 will ideally be non-overlapping. A lens 57 focuses the filtered luminescent radiation onto the detector 33 which may be a photodiode that is sensitive to the range of wavelengths passing through the filter 55.

As an alternative to the use of only an optical fiber system 17 as the light communication medium between the sensor 13 and the optical system 27, other optical elements, such as lenses, can be used either in combination with or in place of optical fibers.

Operation of the system of FIG. 1 is explained with additional reference to the waveforms of FIG. 2. FIG. 2(A) shows periodically repetitive excitation light pulses 61 and 63. The resultant luminescent radiation of the sensor 13 when so excited is shown in FIG. 2(B). During the existence of the excitation pulse 61, for example, between times t0 and t1, the luminescent intensity rises as shown by the curve portion 65. But at time t1 when the pulse 61 ends, the luminescence continues for a time, as indicated by curve portion 67. It is the rate of decay of the curve portion 67 that is measured by the processing circuits 37 as an indication of temperature. By the time t4, the luminescence has substantially ended. The next pulse may occur at any time after that, as indicated by the pulse 63. A single luminescence decay measurement is all that is necessary to determine temperature, but repeating the process allows monitoring changes in temperature and also provides a number of independent readings over a short period of time that may be averaged by the processing circuits 37, if desired, to provide higher precision readings.

A preferred luminescent material for the sensor 13 whose luminescent decay time is being measured has several desirable characteristics. A first is that the decay characteristics be repeatable. That is, the rate of decay and shape of the decay curve 67 of FIG. 2(B) should be the same for repetitive measurements of a single temperature of the sensor 13. It should be independent of the intensity of the excitation radiation, both of the radiation which causes the particular luminescence decay that is being measured and of excitation radiation that has been directed against the sensor in prior measurements. The decay curve 67 should also be independent of any prior temperatures to which the sensor has been driven. The material should be chemically reproducible with a conformity which is sufficient for the desired accuracy. Such repeatability allows a temperature measuring system that requires little or no calibration since the errors caused by non-temperature factors have been eliminated.

In addition, the luminescent material chosen for the sensor 13 should have a decay time of the curve 67 that is long enough to allow measurement with the desired precision. Also, the variation of the decay times as a function of temperature must be great enough to allow measurement with the desired temperature accuracy. Further, these characteristics must occur over a useful range which is desired to be as wide as possible in order to encompass a large number of particular applications.

A further desirable characteristic of the luminescent material, in order to keep simple the measurement by the processing circuits 37 of the luminescent decay time, is that the decay time is either a perfect exponential or substantially so. While all fluorescent systems are expected in theory to show exponential decay, few if any do so. This is because of a variety of factors. First, the decay time is a function of activator concentration as well as temperature. Hence, variations of activator concentration within or between the grains of the luminescent material will lead to a spread of observed emission characteristics or decay times. Secondly, there may be more than one activator site within the crystal structure of the phosphor host compound which may also lead to different decay times. Sometimes a two step trapping phenomenon is also observed which tends to produce a delayed release of luminescence, a phenomenon generally referred to as phosphorescence to distinguish it from the more rapid one step fluorescent process. Finally, emission from other impurity ions or defects in the same wavelength band may be observed.

If the total emission consists of a sum of exponentially decaying signals, those with faster decay will dominate at a short time after cessation of excitation, whereas the more slowly decaying signals will dominate at longer times after cessation of excitation. Under these circumstances, the "decay time" should be measured at the same specific time after excitation for the measurement to be reproduceable with high accuracy and independent of calibration.

Many particular electronic methods for measuring the decay time of such an exponential curve are well known and can be applied to this particular use. One such technique is to measure between two specific times the area under the electrical signal voltage curve at the output of the detector 33 that corresponds to the luminescent decay function. Another is to measure the voltage value of the curve 67 at a particular time after the time t1 and then measure how long it takes for that voltage to fall to a level equal to the reciprocal of the natural logarithmic base times that voltage. These techniques are easily accomplished by standard analog and microprocessor calculating systems which may be incorporated into the processing circuits 37.

A specific example of a technique in implementing circuit for measuring the luminescence decay time is described with respect to FIGS. 4 and 5. Referring initially to FIG. 5, an exciting radiation pulse 105, generated by the lamp 43 (FIG. 1), occurs between the times t0 and t1. The signal in line 35 (FIGS. 1 and 4), at the output of the detector, is illustrated as curve 107 in FIG. 5. The circuits of FIG. 4 are adapted to measure the declining voltage at a time t2 that occurs a preset interval after the beginning of the excitation pulse 105 at time t0. That voltage is identified on FIG. 5(A) as $S_1$. A second voltage $S_1/e$ is then calculated. When the signal represented by the curve 107 falls to that level, the time t3 at which that happens is noted. The interval between t2 and t3 is the decay time period of the curve 107, the desired quantity that can then be converted to temperature.

Referring now to FIG. 4, the signal represented by the curve 107 of FIG. 5(A) occurs in a line 35 that is connected to an input of an amplifier 109 whose output in a line 111 is connected as one of two inputs of a comparator 113. The amplified signal in the line 111 is also applied to an input of a sample and hold circuit 115, which stores a single value of the input signal at the time it receives a sampling pulse in a line 117. The input voltage held by the circuits 115 is presented at an output 119 that is applied to a voltage divider, namely series connected resistors R1 and R2. The second input to the comparator 113 is connected by a line 121 to a junction between series resistors R1 and R2. The values of R1 and R2 are selected so that the voltage at this juncture is equal to the voltage in line 119 divided by the natural logarithm "e".

The portion of the circuit of FIG. 4 described so far can thus be seen to implement the detection technique illustrated in FIG. 5(A). At time t0, a timing circuit 123 of FIG. 4 emits a pulse in line 40 that causes the light pulse generating circuits 41 (FIG. 1) to fire the flash lamp 43. That timing pulse is shown in FIG. 5(B). Subsequently, a fixed interval after time t0, at time t2, the timing circuits 123 emit approximately a 300 microsecond sample and hold pulse in the line 117, as shown in FIG. 5(C). This causes the voltage input to the sample and hold circuits 115 to track and hold using a 100 microsecond averaging circuit to reduce noise effects. Thus, a 100 microsecond average of the signal occurring around time t2 is held at the output 119. The comparator 113 thus receives, after time t2, the fixed voltage value $S_1/e$ in its input 121, and the decaying signal in line 111 that is representative of temperature. As soon as an approximately 10 microsecond average of the signal in line 111 falls to that in line 121, an output in a line 125 changes state. The averaging over a short time reduces undesirable effects of high frequency noise. This occurs at the time t3 that is desired to be determined. The signal in the comparator output line 125 is shown in FIG. 5(F). The interval between times t2 and t3 is thus the time constant of that particular decaying curve.

In order to measure that interval of time, a digital counter 127 is most conveniently employed. In this example, the counter 127 is given an incrementing clock signal from a clock generator 129, through an AND-gate 131 whose output 133 is connected to the clock input of the counter 127. The gate 131 serves to turn the clock on at time t2 and off at time t3. The clock signal is connected by line 135 as one of three inputs to the gate 131. At time t2, the voltage level in the line 125 has been in a state that would allow turning on the gate 131 since a time during the excitation light pulse 105, as shown in FIG. 5(F). The turning on of the gate 131 at exactly time t2 is thus accomplished by a signal in its third input, line 137, shown in FIG. 5(G). The signal in the line 137 originates from an output of a flip-flop circuit 139 that is changed between its two binary states in response to set and reset input pulses. It is set by a pulse in line 117 at time t2 into a state that allows the gate 131 to pass the clock signal through to the counter 127. The flip-flop 139 is restored to its other state by a reset pulse in a line 149 that is generated by the timing circuits 123 sometime after this measurement cycle is completed and before the next one is begun, as represented by FIG. 5(E).

The counter 127 is turned off at time t3 in response to the comparator output signal in the line 125 changing state, as previously discussed. When this occurs, the gate 131 is turned off and the counter 127 then contains a digital value representative of the interval of time between times t2 and t3 in FIG. 5(A). That digital output is thus applied to further processing circuits, shown generally at 143. The function of this additional processing is to convert that time interval count into temperature through use of a table that has previously been empirically determined for the type of luminescent material being utilized. A plurality of such temperature values may be determined in succession by repeating the operational cycle being described, under control of the timing circuits 123. A plurality of such determinations is then averaged, an averaged temperature value being placed on a bus 38 for display.

The remaining circuits 145 of FIG. 4 are in the nature of an automatic gain control for the system. However, the amplification of the signal in line 35 from the detector is not changed, as in usual automatic gain control circuits. Rather, the intensity of the flash from the lamp 43 is set to maintain the luminescent signal received by the detector within optimum intensity ranges. This is done by controlling the voltage in the line 42 to the flashlamp's power supply 41, thus controlling the output of the power supply and intensity of the resulting flash. Although the luminescent intensity level is dependent upon the intensity of the excitation radiation, the material chosen for the sensor has a decay time characteristic that is substantially unaffected by the excitation flash intensity.

The flash intensity control circuits 145 receive the sampled signal in a line 119 as an input, and further operate in response to a timing pulse in a line 147 from the timing circuits 123. A pair of comparator amplifiers 149 and 151 each have one of their two inputs connected to the line 119. The second input of the comparator 149 is held at a constant voltage that represents the high extreme of the desired signal voltages in the line 119. The comparator has its second input maintained at a voltage at the low end of that range. The outputs of the comparators are applied to a pair of flip-flop circuits 153 and 155. The flip-flop circuits are characterized by presenting at their respective output lines 157 and 159 the value of the outputs of their respective comparator amplifiers 149 and 151 upon the occurrence of a latching pulse in a line 147. The lines 157 and 159 are applied to logic circuits 161 whose output in lines 163 is a digital signal that drives a digital to analog converter 165, thereby to generate the control voltage in the line 42.

If the sampled detector output voltage line 119 of a particular cycle falls within the high and low voltages applied to the comparators 149 and 151, of course, no adjustment is made in the flashlamp intensity control voltage in the line 42. But if an out-of-range voltage is detected by the appropriate state in one of the lines 157 and 159, the logic circuits 161 will make an adjustment in the digital signal in the lines 163. If the voltage is too high, the adjustment is to reduce the intensity of the flash. If it is too low, the control signal is raised so that the intensity of the flash during the next cycle is raised. It is preferable, however, to monitor several cycles before making any such adjustment in case the flash intensity of a single cycle is an aberrated value. Commonly available flashlamps are not precisely controllable as to the flash intensity but are generally so within broad ranges.

An advantage of the flash intensity control circuits of 145 is that a wide variety of specific temperature measuring applications and optical communication configurations can be handled with a single instrument. Without the ability to so control the flash intensity, the flash would most typically be driven at a maximum intensity, and the luminescent signal returning from the temperature sensor would then be adjusted, either optically before detection or electronically after detection. By having the ability to reduce the intensity of the lamp flash where appropriate, the lifetime of a particular flashlamp, measured in terms of number of flashes, is increased.

Referring again to FIG. 5(A), it has previously been described that the time t2 which starts the decay time measurement is set to be a fixed interval after the time t0 such that there is some interval between the ending of the flash pulse 105 and the time t2. This is done in this particular example because the excitation wavelengths are close enough to the luminescent wavelengths that the detector 33 (FIG. 1) becomes saturated by the excitation light pulse. The closeness of the wavelengths does not allow the filter 55 to completely remove the excitation light. And since the excitation pulse has such high intensity, the detector 33 requires some time to recover from its saturated state. In cases where the excitation radiation wavelengths are separated further from the luminescent radiation, the optical filter 55 can do a better job of isolating the detector 33 from the excitation pulse. In this latter case, the interval between the times t1 and t2 could be made very small, perhaps even made to be substantially zero. But in either case, the important parameter is to start the decay time period measurement at the same time relative to the excitation light pulse each time the measurement is made. That means that each measurement is made on the same portion of the decaying signal curve 107. This has been found to minimize the effects of the slight deviations in the luminescent radiation from a pure exponential decaying function, as previously described. The lookup table in the processing circuits 143 of FIG. 4 has all been empirically determined for a particular measurement start time t2.

The example described with respect to FIGS. 4 and 5 measure exactly one time constant of the decaying function 107 of FIG. 5(A). That was set by defining the lower threshold voltage $S_1/e$. Other periods could be measured, such as $S_1/2e$ or $2S_1/e$, or even $S_1/2$. So long as the same time period is measured each time, and the lookup tables in the processing circuits 143 are empirically determined for that different interval of time, the resulting temperature readings will correspond. However, it has been discovered that the effect of system noise on the temperature readings in minimized if the interval measured between times t2 and t3 is substantially one decay time period. That is why the lower threshold voltage which determines the end of the period is set at $S_1/e$. Unfortunately, all electro-optical systems generate some noise in the transmission and processing of optical and electrical signals. Available detectors for use as a detector 33 can cause noise problems when temperature measurements are desired which are very accurate. Measuring of periods less than a full time constant period will increase the error of the measurement due to time measurement uncertainties and periods in excess of one time constant period create more error due to a reduced signal-to-noise ratio.

The example of FIGS. 4 and 5 should also be distinguished from an integration technique, which could be also implemented according to the techniques of the present invention. Accuracy is obtained by the system of this example, even in the light of a certain level of noise, by taking several measurements, such as ten, in succession and then averaging the results. Since noise is random, its effect on the average signal is minimized.

Integration of the area under the curve 107 could also be performed electronically between the times t2 and t3 in order to reduce the effective noise on any one measurement. A number of such measurements and their averaging may not then be necessary. In an integration system, the integral of the curve between times t2 and t3 is initially predicted upon measuring the signal $S_1$ at the time t2. The instrument then measures the time it takes for the integral to reach that predicted amount, that time being equal to a time constant of the luminescent decay function. Even in the integration case, the commencement of the integration period is fixed in time with respect to the light pulse, and only a certain interval of the decaying signal curve 107 is measured, preferably an interval equal to the decay time constant. Measuring all of the area under the curve 107 until the signal becomes so low as to be unmeasurable will give erroneous readings by including very noisy signal regions.

A preferred luminescent material having the desirable characteristics outlined above is a phosphor made of a host of either magnesium germanate or magnesium fluorogermanate, activated with tetravalent manganese. The concentration of the activator (based on starting materials) should be within the range of from 0.05 to 5.0 mole percent, approximately one mole percent being preferable. The concentration of the activator controls the decay time and the intensity of luminescence. Magnesium fluorogermanate is sold commercially for use in lamps as a red color corrector in high pressure mercury lamps. Composition of a manganese activated magnesium germanate phosphor for use in the sensor 13 is $Mg_{28}Ge_{10}O_{48}$ (1 mole % $Mn^{+4}$). Composition of a manganese activated magnesium fluorogermanate phosphor for such use is $Mg_{28}Ge_{7.5}O_{38}F_{10}$ (1 mole % $Mn^{+4}$). The decay time of the latter phosphor as a function of its temperature is shown in FIG. 3 over the extremely wide temperature range throughout which the material is useful as a temperature sensor. It will be noted that the measured decay times vary from about five milli-seconds for the lower temperature of this range (about $-200°$ C.) to about one milli-second for the higher temperature (about $+400°$ C.), decay times which are easily measured to high accuracy by electronic techniques.

Each temperature sensor is made up of a powder of such a phosphor. That is, rather than one or a few crystals, there are hundreds, or even thousands, of individual grains or crystallites of the size of a few microns, typically from one to ten microns, held together by an inert, transparent binder to form any of the particular forms of sensors described herein. Each grain has a temperature dependent luminescence that contributes to the total observed luminescence although the variation from crystallite to crystallite is small. The use of samll grains in a powder allows close conformity (i.e. good thermal contact) with a surface whose temperature is being measured, desirable in many applications.

These phosphor grains are preferably manufactured by a well-known dry process. A mixture of particles of the desired resulting phosphor component compounds is thoroughly mixed and blended. Any aggregates of such particles are also broken up without fracturing the particles themselves. The resulting mixture is then fired in a controlled atmosphere at a certain temperature for a set time. A description of this process is given in Butler, *Fluorescent Lamp Phosphors,* particularly Sections 1.1 and 1.2.

The growing of phosphor crystals from a liquid starting compound is not suitable for this application since the resulting crystals are not homogenous throughout. Primarily, the activator concentration is not uniform throughout such a crystal, and this results in significantly different luminescent decay times from different parts of the crystal. The luminescent decay time varies significantly as the activator concentration varies, for the same temperature. This is obviously undesirable, so the making of the phosphor to have uniform activator concentration is very important for a system that gives repeatable, accurate results in temperature measurement.

Referring to FIG. 6, a variation of the system of FIG. 1 is illustrated wherein the system is used for a different application. An optical fiber communication medium 17' corresponds to the fiber medium 17 of FIG. 1. Rather than measuring the temperature of a surface, as in FIG. 1, the modification in FIG. 6 utilizes a temperature sensor 71 that is carried by the optical fiber medium 17' adjacent its end 15'. The sensor 71 may take any of a number of forms, that shown in FIG. 6 being a tubular structure 73 for receiving the optical fiber medium 17' through an open end thereof. An opposite end is closed and carries a layer of luminescent material 75. Since the distance between the luminescent material 75 and the end 15' may vary from measurement to measurement, the use of the class of luminescent materials and techniques described with respect to FIGS. 1 and 2 have all the advantages described with respect to that system and application. The application illustrated in FIG. 6 has an advantage where the sensor 71 is desirably disposable, such as in human oral temperature measuring applications, so it is desirable to make the sensor 71 easily attachable and detachable from the fiber 17'. Some positive attachment mechanism may be desirable for certain applications.

Another form of probe cover is illustrated in FIG. 7 for applications in measuring temperatures in excess of that which ordinary optical fibers can withstand or measuring surface temperatures. An end of an optical fiber 17" has all organic materials removed and a cover 81 positioned over it. The cover 81 is tubular in shape and made of a material that can withstand high temperatures, such as pyrex, quartz or alumina ceramic. The cover 81 is made to be rigid in order to also provide structural support for the fiber (or fibers) 17" which has been weakened by removal of its buffer coating and/or jacket. Luminescent powder is mixed with a glass binder and the mixture is affixed onto an end of the ceramic tube to form a sensor 85.

For contact surface temperature measurement, either of the probe covers of FIGS. 6 or 7 may be utilized with their sensor end being placed against the surface whose temperature is to be measured. For this application, it is desirable to keep a consistent air space between the fiber end and the sensor so that heat conducted away from the sensor by the quartz fiber can be eliminated. An example of this is shown with the probe cover of FIG. 7, wherein an inwardly extending ring 83 provides an abutment for contacting an end 15" of the fiber 17" and holding the cover in a proper position to provide the desired air space. Alternatively, an abutment can be provided on the fiber 17" adjacent the open end of the tube 81 to hold it in position. The use of an air space that results from such an abutment is not necessary for non-contact, high temperature measurements, so the abutment can be omitted when contact measurements are not to be made.

For making surface measurements, it is often not convenient to paint the luminescent material and binder directly onto the surface whose temperature is to be monitored. An alternative to paint is to provide the luminescent material attached to a carrier in order to form a sensor that may easily be attached to such a surface. FIG. 8 illustrates one form of such a sensor. A substrate 91, such as a thin plastic sheet, has luminescent powder 93 in a binder attached to one surface. On an opposite surface of the substrate 91 is optionally provided an adhesive layer of material 95 to allow the sensor to be easily attached to the surface. The sensor can be small, such as one square inch or less, thus making it convenient for making measurements of small, as well as large, objects.

Referring to FIG. 9, a modification of the sensor of FIG. 8 is shown wherein the substrate 97 is itself provided with the luminescent material powder embedded therein. The substrate 97 is made of optically clear material. An adhesive layer 99 is applied to one side of the substrate 97 and a protective layer 101 is attached to the adhesive, such as wax paper, for easy removal just prior to attachment of the sensor to the object surface whose temperature is to be monitored.

In some applications, it may be desirable to coat the sensor material directly onto the part of interest, or to coat parts similar to the part of interest, in order that they may be used as witness samples or process calibration samples. For example, silicon wafers might be coated with the sensor material and then be used to optimize the process temperature in various stages of silicon device fabrication.

Referring to FIG. 10, yet another modification and application of the system of FIGS. 1 and 2 is illustrated. An optical fiber communication medium 17''' has a quantity of luminescent material 81 permanently attached to the free end 15''' of the optical fiber medium. The end is also covered by a coating 83 for light shielding and mechanical protection. The probe is immersed in an object indicated at 85 which can be almost anything. Prior optical temperature sensing techniques that require frequent calibration have not allowed remote temperature measurement in the interior of large electrical power transformers, for example, since the sensors must be installed as the transformer is built. Once installed, they cannot be calibrated without total shutdown and subsequent thermal equilibrium of the system being established, so the prior techniques suffer a significant disadvantage for the particular application being described. But with the improved luminescent material and technique of the present invention, this can be done.

Although the various aspects of the present invention have been described with respect to its preferred embodiments, it will be understood that the invention is entitled to protection within the full scope of the appended claims.

It is claimed:

1. A method of determining the temperature of an environment, comprising the steps of:
    positioning in thermal communication with said environment a luminescent material which contains a luminescent activator of tetravalent manganese and which is characterized by emitting, when excited with transient radiation, luminescent radiation having an intensity which decreases after termination of the excitation radiation in a manner that can be correlated with the temperature of the luminescent material,
    exposing said luminescent material to transient excitation radiation, thereby causing said luminescent material, after termination of the excitation radiation, to luminesce with a decreasing intensity function related to the temperature of the luminescent material, and
    detecting and measuring the decreasing luminescent intensity function, thereby to measure the temperature of the luminescent material, whereby the temperature of said environment is determined.

2. The method according to claim 1 wherein said luminescent material additionally contains together in a compound with said activator a host of either magnesium germanate or magnesium fluorogermanate.

3. The method according to claim 1 wherein the step of positioning the luminescent material includes positioning the material in the form of a powder suspended in a vehicle or binder.

4. The method according to claim 1 wherein the detecting and measuring step includes measuring the decreasing luminescent intensity beginning a fixed time interval after said excitation radiation.

5. The method according to claim 1 wherein the luminescent activator is present in a concentration such that the luminescent material is characterized by its decaying luminescent radiation having a decay time of about five milli-seconds for a temperature of the luminescent material of about −200 degrees centigrade and about one milli-second for +400 degrees centigrade.

6. The method according to claim 1 wherein the step of positioning the quantity of luminescent material comprises attaching said material in the form of a layer to a surface which is said environment whose temperature is to be measured.

7. The method according to claim 1 wherein the steps of exposing the luminescent material and detecting the luminescent decaying function comprise the steps of:
    positioning a length of optical fiber communication medium having an end positioned adjacent to but spatially removed from said luminescent material, and
    communicating said excitation radiation and said luminescent intensity between said fiber and said luminescent material through said fiber end.

8. The method according to claim 7 wherein the step of positioning a quantity of luminescent material comprises attaching said material to a surface which is said environment whose temperature is being determined.

9. The method according to claim 7 wherein the step of positioning a quantity of luminescent material comprises the step of removably attaching to said fiber near its said end a carrier to which the luminescent material is attached.

10. The method according to claim 7 which comprises the additional step of determining from the detected luminescent decaying intensity function the temperature of the luminescent material without first calibrating a measurement at a known temperature of the luminescent material.

11. The method according to claim 1 which comprises the additional step of determining from the detected luminescent decaying intensity function the temperature of the luminescent material without first calibrating a measurement at a known temperature of the luminescent material.

12. The method according to claim 1 wherein the step of positioning said quantity of luminescent material comprises the steps of attaching said luminescent material to an end of an optical fiber communication medium and permanently positioning said end in the environment whose temperature is to be measured prior to making any temperature measurement therewith.

13. The method according to claim 1 wherein said luminescent material is further characterized by emitting a detectable luminescent decaying intensity function over a temperature range of substantially from −100 to +400 degrees centigrade.

14. The method according to claim 1 wherein said environment is a moving object and said luminescent material is affixed thereto, and further wherein the step of detecting the luminescent decaying intensity function includes the step of imaging its luminescence through the use of optical commutation.

15. The method according to claim 1 wherein the step of detecting the luminescent decaying intensity function includes the step of communicating said luminescent radiation to a detection station from the luminescent material by an optical system having optical elements that are not physically fixed with respect to either the luminescent material or each other.

16. The method according to claim 3 wherein said luminescent material is of a type made by mixing dry particles of component compounds of the resulting luminescent material, and then firing the mixture at a controlled temperature and in a controlled atmosphere, whereby a material is formed that is a powder which is very homogeneous in its luminescent properties.

17. The method according to any of claims 3, 4, 5, 6 and 16 wherein said luminescent material additionally contains together in a compound with said activator a host of either magnesium germanate or magnesium fluorogermanate.

18. The method according to any of claims 1-5 wherein the activator is present in a concentration within a range of from substantially 0.05 to 5.0 mole percent.

19. The method according to any of claims 1-5 wherein the activator concentration is substantially one mole percent.

20. For use with a temperature measuring instrument that generates transient radiation to excite a luminescent material and then measures a decreasing intensity function of the luminescence after termination of the excitation radiation in order to determine the temperature of the the luminescent material, a sensor (1) comprising a length of optical fiber carrying at one end thereof a luminescent material having an activator component consisting essentially of tetravalent manganese and a host component, and (2) being characterized by emitting along the length of the optical fiber, when excited with transient radiation from along the optical fiber, luminescent radiation having an intensity that decreases after termination of the excitation radiation in a manner related to the temperature of the luminescent material.

21. For use with a temperature measuring instrument that generates transient radiation to excite a luminescent material and then measures a decreasing intensity function of the luminescence after termination of the excitation radiation in order to determine the temperature of the luminescent material, a sensor comprising a substrate adapted to be positioned against a surface whose temperature is to be measured, said substrate having a quantity of luminescent material carried thereby, said luminescent material having a an activator component consisting essentially of tetravalent manganese and a host component, the sensor being characterized by emitting, when excited with transient radiation, luminescent radiation having an intensity that decreases after termination of the excitation radiation in a manner related to the temperature of the luminescent material.

22. For use with a temperature measuring instrument that generates transient radiation to excite a liminescent material and then measures a decreasing intensity function of the luminescence after termination of the excitation radiation in order to determine the temperature of the luminescent material, a sensor comprising:
an elongated hollow member being open at one end in a manner adapted to receive an end of an optical fiber therethrough, and
a quantity of luminescent material being carried by another end of said hollow member in a manner to be in optical communication with said optical fiber through its said end, said luminescent material having a host compoenent and an activator component, the activator component consisting essentially of tetravalent manganese,
the sensor being characterized by emitting along the length of the optical fiber, when excited with transient radiation along the optical fiber, liminescent radiation having an intensity that decreases after termination of the excitation radiation in a manner that is related to the temperature of the luminescent material.

23. The optical temperature sensor according to claim 21 which additionally comprises means carried by the substrate for adhering the substrate to said surface.

24. The temperature sensor according to claim 22 wherein said hollow member is closed at its said opposite end and said luminescent material is attached to the closed end with a binder material in a manner to optically communicate with an end of an optical fiber when inserted into the hollow member from its open end.

25. The temperature sensor according to claim 22 wherein said hollow member is also open at its said opposite end and is made from a vitreous or ceramic material, and said luminescent material is fused into the opposite end of the hollow member with a glass binder in a manner to close said opposite end of the hollow member, thereby forming a combination that is able to physically withstand high temperatures, whereby high temperature measurements may be taken.

26. The temperature sensor according to claim 22 which additionally comprises an abutment extending inwardly of said hollow member a distance from said opposite end, said abutment being shaped to engage an end of said optical fiber and hold the hollow member and fiber in a predetermined relative axial position, thereby to form an air chamber in said distance between said luminescent material and said fiber end, whereby surface temperature measurements may be made with the luminescent material at said opposite end of the hollow member held against the surface.

27. The temperature sensor according to any of claims 23 and 20-22 wherein the host component of the luminescent material comprises either magnesium germanate or magnesium fluorogermanate.

28. The temperature sensor according to any of claims 20-22 wherein the activator is present in a concentration within a range of from substantially 0.05 to 5.0 mole percent.

29. The temperature sensor according to any of claims 20-22 wherein the activator concentration is substantially one mole percent.

30. The temperature sensor according to any of claims 20-22 wherein the activator concentration is such that the luminescent material is characterized by its decaying luminescent radiation having a decay time of about five milli-seconds for a temperature of the luminescent material of about −200 degrees centigrade and about one milli-second for a temperature of about +400 degrees centigrade.

31. A system for measuring the temperature of an environment, comprising:
a quantity of luminescent material adapted to be positioned in thermal communication with said environment, said luminescent material (A) being characterized by emitting, when excited with transient radiation, luminescent radiation having an intensity which decreases after termination of the excitation radiation, and (B) including a luminescent composition having a host component and an activator component, the activator component consisting essentially of tetravalent manganese in a concentration effective to cause the decreasing lumination radiation to have a decay time of about one or a few milliseconds for temperatures of said luminescent material within a range of from about negative 200 degrees centigrade to about positive 400 degrees centigrade,
means including a source of transient excitation radiation for exposing said luminescent material to an excitation radiation pulse, thereby causing said luminescent material to luminesce after termination of the pulse with a decreasing intensity function having a decay time that is related to the temperature of the luminescent material, means receiving luminescent radiation of the luminescent material for detecting said decreasing intensity of its luminescent radiation, thereby to generate an electrical signal proportional thereto, and means responsive to said electrical signal for measuring a decreasing characteristic of said electrical signal, thereby to determine a quantity that corresponds to the temperature of the luminescent material and thus also to the temperature of said environment.

32. The temperature measuring system according to claim 31 wherein the host component of the luminescent material comprises either magnesium germanate or magnesium fluorogermanate.

33. The temperature measuring system according to claim 32 wherein the activator component of the luminescent material has a concentration within a range of from 0.05 to 5.0 mole percent.

34. The temperature measuring system according to claim 32 wherein the activator component of the luminescent material has a concentration of substantially one mole percent.

35. A system for measuring the temperature of an environment, comprising:

a quantity of luminescent material adapted to be positioned in thermal communication with said environment, said luminescent material being in a physical form of a powder held together with a binder and being characterized by emitting, when excited with transient radiation, luminescent radiation having an intensity function continuing in time after termination of the excitation radiation, said intensity function (A) approximating a single repeatable exponential decaying function for each temperature of the luminescent material desired to be measured within a range of temperatures, and (B) being substantially independent of the excitation radiation intensity and any prior illumination or temperature history of the luminescent material, means including a source of transient excitation radiation for exposing said luminescent material to an excitation pulse, thereby causing said luminescent material to luminesce with a decaying intensity function after the pulse that is related to the temperature of the luminescent material, means receiving luminescent radiation of the luminescent material for detecting the decaying intensity of said luminescent radiation, thereby to generate an electrical signal proportional thereto, means responsive to said electrical signal for determining a decay time constant of said electrical signal beginning a particular time after said radiation pulse, thereby to determine a quantity that corresponds to the temperature of the luminescent material and thus also the temperature of said environment, and said source of transient excitation radiation including means responsive to the magnitude of said electrical signal for adjusting the intensity of the excitation pulse in order to maintain said electrical signal within a desired magnitude range.

36. In a system for measuring the temperature of an environment by use of a quantity of luminescent material adapted to be positioned in thermal communication with said environment, said luminescent material being characterized by emitting, when excited with transient radiation, luminescent radiation having an intensity function which decreases with time, after termination of the excitation radiation, in a manner related to its temperature, an instrument comprising:

means including a source of transient excitation radiation for exposing said luminescent material to a plurality of excitation pulses with time between pulses sufficient to allow said luminescent material to luminesce with a decreasing intensity function that is uniquely related to the temperature of the luminescent material, means receiving luminescent radiation of the luminescent material for detecting the decreasing intensity of said luminescent radiation, thereby to generate an electrical signal proportional thereto, means responsive to said electrical signal for determining a characteristic of the decreasing signal, thereby to determine a quantity that corresponds to the temperature of the luminescent material and thus also to the temperature of said environment, and means responsive to the magnitude of said electrical signal for adjusting the intensity of subsequent excitation pulses in order to maintain said electrical signal within a desired magnitude range.

37. The combination of either of claims 35 or 36 wherein said source means and said receiving means include a common length of an optical fiber transmission medium having said luminescent material carried by one end thereof.

38. The combination of either of claims 35 or 36 wherein said source means and said receiving means include a common length of an optical fiber transmission medium having said luminescent material carried by one end thereof, and further wherein said luminescent material includes an activator consisting essentially of tetravalent manganese.

* * * * *

UNITED STATES PATENT AND TRADEMARK OFFICE
CERTIFICATE OF CORRECTION

PATENT NO. : 4,789,992
DATED : Dec. 6, 1988
INVENTOR(S) : Wickersheim, et al.

It is certified that error appears in the above-identified patent and that said Letters Patent is hereby corrected as shown below:

Col. 17, line 19: delete "the"; SECOND OCCURRENCE.
line 38: delete "a" after "having";
line 46: replace "liminescent" with --luminescent--;
line 59: replace "compoenent" with --component--; and
line 64: replace "liminescent" with --luminescent--.

Cover page, identification of inventors: delete lines 4 and 5 showing duplicate "Stanley O. Hinemann, Irvine, all of Calif."

Signed and Sealed this

Eleventh Day of April, 1989

Attest:

DONALD J. QUIGG

Attesting Officer

Commissioner of Patents and Trademarks